United States Patent [19]

Maeda

[11] Patent Number: 4,631,531
[45] Date of Patent: Dec. 23, 1986

[54] SYSTEM FOR TEXT DISPLAY WITH PLURAL PAGE MEMORY AND FLAG MEMORY

[75] Inventor: Satoru Maeda, Yamato, Japan
[73] Assignee: Sony Corporation, Tokyo, Japan
[21] Appl. No.: 491,205
[22] PCT Filed: Aug. 24, 1982
[86] PCT No.: PCT/JP82/00333
  § 371 Date: Apr. 26, 1983
  § 102(e) Date: Apr. 26, 1983
[87] PCT Pub. No.: WO83/00789
  PCT Pub. Date: Mar. 3, 1983

[30] Foreign Application Priority Data
  Aug. 27, 1981 [JP] Japan ............................... 56-134582
[51] Int. Cl.[4] ....................................... G09G 1/28
[52] U.S. Cl. ....................... 340/701; 340/723; 340/750; 340/799
[58] Field of Search ............ 340/701, 723, 798, 799, 340/750; 358/141, 142, 146, 147

[56] References Cited
U.S. PATENT DOCUMENTS

| | | | |
|---|---|---|---|
| 3,771,155 | 10/1973 | Hayashi et al. | 340/750 |
| 4,161,728 | 7/1979 | Insam | 340/799 |
| 4,191,956 | 3/1980 | Groothuis | 340/799 |
| 4,213,124 | 7/1980 | Barda et al. | 340/750 |
| 4,290,062 | 9/1981 | Marti et al. | 340/750 |
| 4,315,257 | 2/1982 | Hernandez | 340/799 |
| 4,323,892 | 4/1982 | Kinghorn | 340/750 |

Primary Examiner—Gerald L. Brigance
Assistant Examiner—Jeffery A. Brier
Attorney, Agent, or Firm—Lewis H. Eslinger; Alvin Sinderbrand

[57] ABSTRACT

A system for displaying text data includes a plural page memory and a flag memory, in which flags are set to identify the desired page data for display, and a flag controller and read-out controller operate so that when an erase code is included in the data the display is blanked but when the data includes an image signal a desired text page is displayed.

3 Claims, 27 Drawing Figures

SYSTEM FOR TEXT DISPLAY WITH PLURAL PAGE MEMORY AND FLAG MEMORY

TECHNICAL FIELD

This invention relates to an image display apparatus which receives an image signal of a television multicharacter broadcast or CAPTAIN system and displays an image thereof on a cathode ray tube in which even if the memory that is required to store the image signal has the capacity for plural pages, it is not required to be of high speed in access.

BACKGROUND ART

In a television broadcast, a television multicharacter broadcast has been considered in which various informations such as news, weather forecast, announcement and so on are broadcast by utilizing the vertical blanking period of the television broadcast. As an example thereof, there is proposed a format shown in FIGS. 1 to 3.

Figure 1:
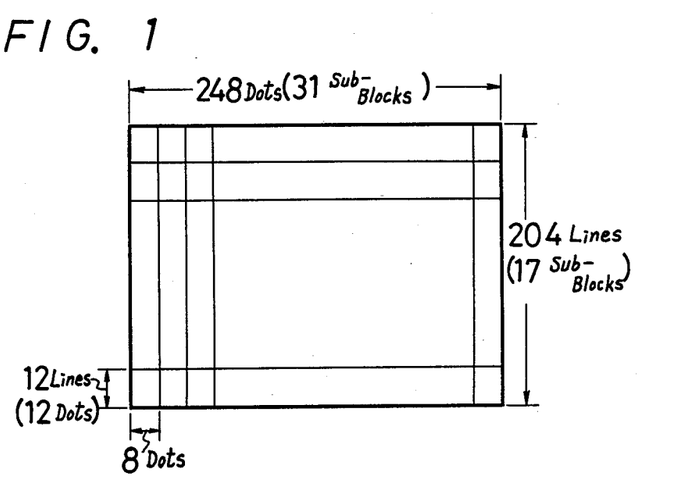
FIG. 1 is a pictorial representation of a data format for a picture screen known in the prior art.

The format shown in the figures is a format used by NHK(Nippon Hoso Kyokai), the Japanese broadcast association. As shown in FIG. 1, picture elements of 248 dots form one horizontal line, 204 lines thereof constitute one page and one page forms one picture screen. However, one picture element takes a binary digit of "1" or "0". Further, picture elements of 8 dots×12 dots (lines) are called as one sub-block so that one page includes 31×17 sub-blocks. And, color is appointed at the unit of one sub-block. Further, the number of pages is selected, for example, about several tens and the data of several ten pages are delivered repeatedly.

Figure 2A:
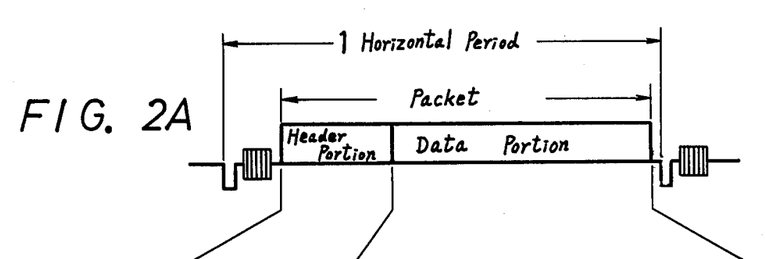
FIG. 2A is a pictorial representation of a serial data signal.

The data signal thereof is delivered as a serial digital signal as shown in FIG. 2A during the 20th horizontal period (in case of an odd field period) and the 283rd horizontal period (in case of an even field period) in the vertical blanking period. The data signal of a desired page is delivered at every one page in the following manner.

Figure 2B:
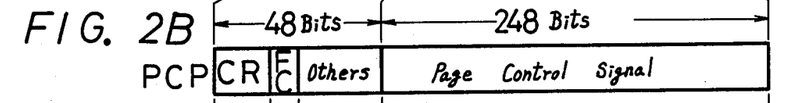
FIGS. 2B-2D are pictorial representations of the bit arrangement within the signal of FIG. 2A.
Figure 3A:
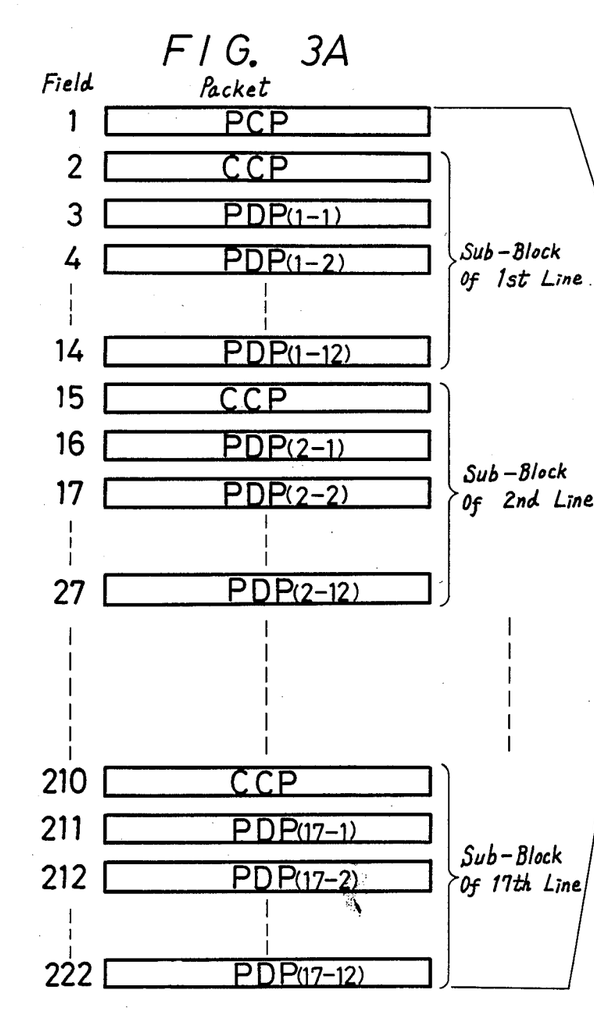
FIG. 3A is a pictorial representation showing the content of the several fields making up a page of data.

That is, as shown in FIG. 3A, during the first field period a page control packet PCP is delivered. As shown in FIG. 2B, this packet PCP includes in its header portion of 48 bits a clock run-in CR, a framing code FC and other control signals and in its data portion of 248 bits a page control signal representing to which page this data signal belongs and so on.

Figure 2C:
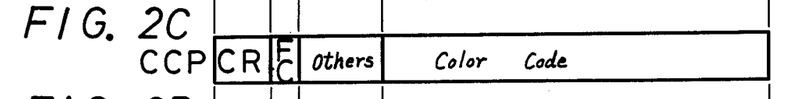

During the second field period, delivered is a color code packet CCP. As shown in FIG. 2C, this packet CCP includes in its data portion a row code representing to which sub-blocks of row orders the following 12 packets belong and a color code appointing the color of each sub-block at the unit of one sub-block. In this case, the color code consists of 4 bits per one sub-block and appoints the color of the sub-block.

Figure 2D:
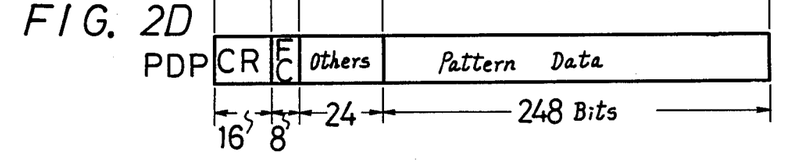

Further, during the third to 14th field periods, 12 pattern data packets PDP are sequentially delivered. As shown in FIG. 2D, the packets PDP comprise in the data portion thereof picture elements of 1st to 12th lines in 31 sub-blocks of 1 line. For example, the first pattern data packet PDP, which is delivered during the third field period, sequentially includes in its data portion the picture elements in the first lines of the respective sub-blocks of the first line.

Accordingly, by the packets delivered during the second to 14th field periods, all the picture elements of the sub-blocks on the first line of one page and their colors are completed.

Similarly, the sub-blocks of one line are delivered by one color code packet CCP and 12 pattern data packets PDP following thereto.

By this manner, when during the 222nd field period the picture elements on the 12th line of the 17th sub-block are delivered by the packet PDP, the data of one page are thereby delivered.

Accordingly, the data of one page are delivered by one page control packet PCP, 17 color code packets CCP and 204 (=12×17) pattern data packets PDP, in which 204 pattern data packets PDP correspond to the picture elements of FIG. 1.

Figure 3B:
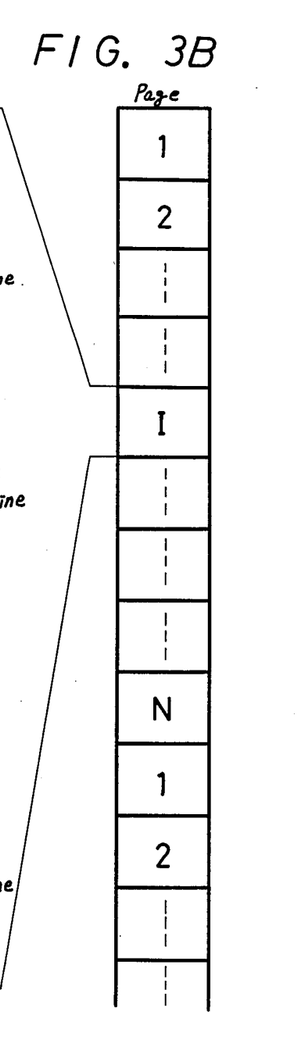
FIG. 3B shows a repeated number of such pages.

As set forth above, during 222 field periods 222 packets are delivered and hence the data of one page are delivered. When such the operation will be repeated for each of pages as shown in FIG. 3B as well as the data of all the pages will be delivered, the data will be delivered again from the first page.

As described above, the character broadcast signal of the F-mode is delivered. The packet construction of other S-, V- and H-modes is substantially same as that of the above.

Figure 4:
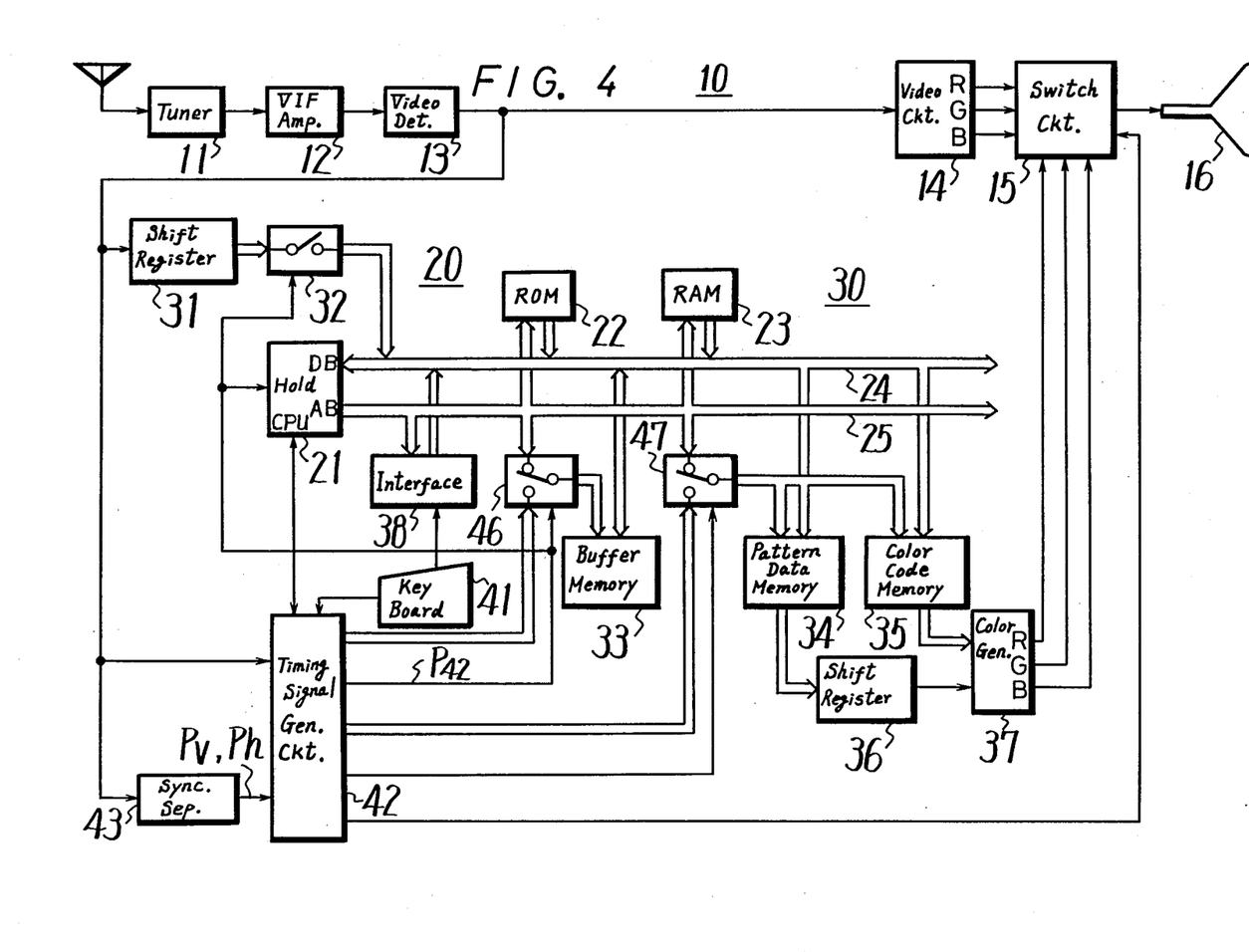
FIG. 4 is a schematic in block diagram form of a television receiver suitable for use in receiving a character broadcast having a format as shown in FIGS. 1A, 2A-2D and 3A-3B.

The television receiver for receiving the character broadcast with the afore-mentioned format is constructed, for example, as shown in FIG. 4.

That is, in FIG. 4, 10 generally designates a video signal system, 11 a tuner, 12 a video intermediate frequency amplifier, and 13 a video detecting circuit. Upon receiving a usual television broadcast, the color video signal from the detecting circuit 13 is fed to a video circuit 14 which then produces three primary color signals which are supplied through a switch circuit 15, which will be described later, to a color cathode ray tube 16 on which a color image is reproduced.

In FIG. 4, 20 generally designates a micro-computer which controls the reproduction of the character broadcast. That is, 21 denotes a CPU of, for example, 8-bit parallel processing type, 22 a ROM on which written is a program for receiving the character broadcast, and 23 a RAM for a work area, which are connected through a data bus 24 and an address bus 25.

30 generally designates a reproducing circuit for the character broadcast. 33 designates a buffer memory having the capacity of one packet, 34 and 35 display memories each having the capacity of one page. The memory 34 is used to memorize the pattern data, while the memory 35 is used to memorize the color code. Further, 41 shows a key board. This key board 41 comprises a key (switch) for switching a mode for receiving the usual television broadcast and a mode for receiving the character broadcast, a key for selecting a page and so on. The output from the key board is delivered through an interface 38 to the data bus 24 and also to a timing signal generating circuit 42. This generating circuit 42 is formed of a PLL, a counter, a logic circuit and so on, is supplied with the video signal from the detecting circuit 13 as well as vertical and horizontal synchronizing pulses Pv and Ph from a synchronous separating circuit 43 and then generates various signals such as an address signal upon the writing of the memory 33, an address signal upon reading the memories 34 and 35 and so on in synchronism with the above synchronizing pulses and the clock run-in CR. A flag showing the vertical scanning period and vertical fly-back period is fed from the generating circuit 42 to the CPU 21 which in turn supplies a flag representing the ends of various processes and a system control signal to the generating circuit 42.

The video signal from the detecting circuit 13 is supplied to a serial-in/parallel-out shift register 31 of 8 bits in which the packet is converted from a serial signal to a parallel signal at every 8 bits. The parallel signal therefrom is fed to a gate circuit (3-state buffer) 32 which is also supplied with a pulses P42 as the control signal which is provided by the generating circuit 42 and becomes "1" during the horizontal periods (20th and 283rd horizontal periods) from which the signal of the packet is delivered to the data bus 24 in parallel 8 bits by 8 bits.

Also, at this time, the pulse P42 is supplied to the CPU 21 as the holding signal so that the CPU 21 is made in the holding state during the horizontal period of the packet, and this pulse P42 is fed to a change-over gate 46 as the control signal so that the address signal from the generating circuit 42 is applied to the memory 33 through the gate 46.

Accordingly, the signal of the packet is transferred 8 bits by 8 bits and in parallel from the register 31 through the gate circuit 32 and the data bus 24 to the memory 33 by the manner of DMA and then written in the memory 33 sequentially.

When the horizontal period of the packet is terminated, P42="0" is established and the register 31 is disconnected from the data bus 24 by the gate 32. At this time, the CPU 21 is released from the holding state thereof and the address bus 25 is connected to the memory 33 through the change-over gate 46.

Then, the data from the memory 33 is processed by the CPU 21 in accordance with the program of the ROM 22 and it is judged whether or not the data are those of a desired page inputted from the key board 41 by the page control signal. If the data are not the data of the desired page, the data are neglected.

The above operation will be repeated at every field until the packet of the desired page is delivered.

When the data from the memory 33 is that of the packet of the desired page, the following operation is carried out. That is, when the packet CCP is delivered, this packet is written in the memory 33 by the DMA similar to the above. Then, when the writing of the packet CCP is finished and the CPU 21 is released from the holding state, the data of the memory 33 is processed by the CPU 21, the color code is read out from the memory 33 and then written in the memory 35 through the data bus 24. This write-in is carried out by such a manner that during the same vertical fly-back period, the address bus 25 is connected through a change-over gate 47 to the memory 35, and the address of the memory 35 is appointed by the CPU 21.

Further, when the packet PDP is transmitted, this packet is written in the memory 33 by the DMA and then only the pattern data are transferred from the memory 33 to the memory 34 during the vertical fly-back period by the processing of the CPU 21. The address appointment of the memory 34 is carried out by the CPU 21, too.

As set forth above, when packets CCP and PDP of the desired page are delivered, these packets are once stored in the memory 33 by the DMA and then only the necessary data are transferred to the memories 34 and 35 by the CPU 21 and then written therein.

When the data of the last packet of the desired page are transferred to the memory 34, the CPU 21 is again made in a standby state for a desired page.

While, during the vertical scanning period, the control signal is supplied from the generating circuit 42 to the change-over gate 47, the address signal from the generating circuit 42 is supplied to the memories 34 and 35 through the change-over gate 47 and the color code and pattern data of the memories 35 and 34, respectively are read out simultaneously.

The pattern data read out from the memory 34 are fed to a parallel-in/serial-out shift register 36 of 8 bits and then converted thereby from the parallel signal to the serial signal which is then fed to a color generator 37 to which the color code read out from the memory 35 is applied. Thus, the data signal is made as three primary color signals thereby and then supplied to the switch circuit 15. At this time, the control signal is applied from the generating circuit 42 to the switch circuit 15 so that the switch circuit 15 is switched to the side of the generator 37.

Accordingly, the desired page of the character broadcast is displayed on the color cathode ray tube 16.

As explained above, the television receiver shown in FIG. 4 receives the character broadcast.

By the way, since the above character broadcast requires 222 field periods i.e. 3.7 seconds for transmitting the image of one page, the waiting time from the input of the number of a desired page to the display thereof becomes long sometimes and longer than 30 seconds at the worst.

Figure 5:
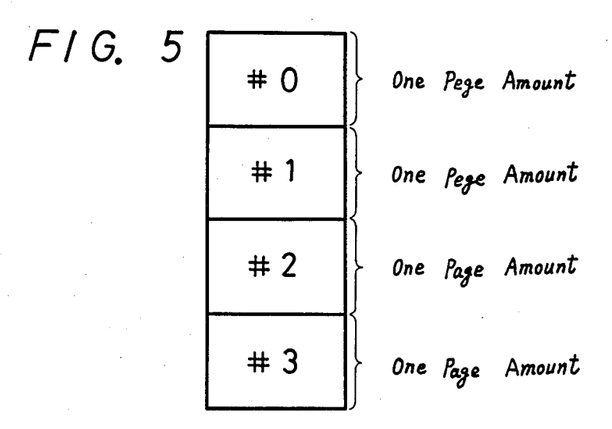
FIG. 5 is a pictorial representation of a four-page capacity memory for use in the receiver of FIG. 4.

Therefore, such a method has been considered that the capacities of the memories 34 and 35 are each made as, for example, largeness of 4 page amounts of areas #0, #1, #2 and #3 as shown in FIG. 5 and pages which are required frequently are always received and respectively written in the areas #0 to #3. That is, according to this method, if the area of those #0 to #3 in which a necessary page is already written is selectively read out, the necessary page can be immediately displayed.

Accordingly, according to this method, if a page which is required frequently, for example, program guide, announcement and so on of the character broadcast is desired to be displayed, such page can be seen at once, which is very convenient.

However, if such method is employed, very high speed memories are required to be used for the pattern data memory 34 and color code memory 35.

Additionally, the page control packet PCP sometimes contains an "erasing code" which functions as a control code. Thus, when a certain page is appointed, if the page control packet PCP of this page contains the erasing code, it is necessary that within one field period, during which the next packet is delivered, the data of all "0" are set on the pattern memory 34 as the erasing data and the color data of all "white" are set on the color memory 35.

When the capacity of the memories 34 and 35 is one page amount, the capacity of the memory 34 is $248 \times 204 = 50592$ bits and that of the memory 35 is $31 \times 17 \times 4 = 2108$ bits If the capacities are set as above, within one field period before the next packet is transmitted, erasing data can be set.

However, in the case that the memories 34 and 35 have the capacity for 4 page amounts of areas #0 to #3 as shown in FIG. 5, if while the data of the area #0 are displayed, the erasing code for the area #1 is transmitted, it is necessary that while the data read-out for the area #0 is carried out, the erasing data for the area #1 is written at the same time and that the write-in of the erasing data must be achieved within one field period before the next packet is transmitted.

Accordingly, in this case it is carried out that the read-out for the area #0 is performed normally as well as the write-in of the erasing data for the area #1 is performed in the vertical or horizontal blanking period or that the read-out for the area #0 and the write-in of the erasing data for the area #1 are made high and achieved in a time sharing manner. However, according to the former method, since within the very short period i.e. blanking period the erasing data must be written in all of the area #1, the memories 34 and 35 must be very high speed ones. While, according to the latter method, since it takes the time sharing process, high speed memories are necessary for the memories 34 and 35, too, especially since the similar time sharing process is achieved for the other areas #2 and #3, more higher speed memories are required as the memories 34 and 35 or owing to the speed of the memories 34 and 35 the number of the areas is limited. Further, with any of the methods the peripheral circuit becomes rather complicated in construction.

If a number of small capacity chips are used as the memories 34 and 35 and one chip or more is allocated to every one of the areas #0 to #3, the read-out and write-in can be freely carried out at the chip unit so that the problem of high speed never occurs. However, this results in the increase of the number of chips and hence the cost becomes high, the apparatus becomes large in size and the power consumption is increased. Recently, such tendency appears that the capacity of a memory increases per one chip and the cost of one bit becomes low, so that it must be avoided to use a number of small capacity memories.

Accordingly, the present invention is to solve the problem when the memories 34 and 35 have the area for plural page amounts.

DISCLOSURE OF INVENTION

Figure 6A:
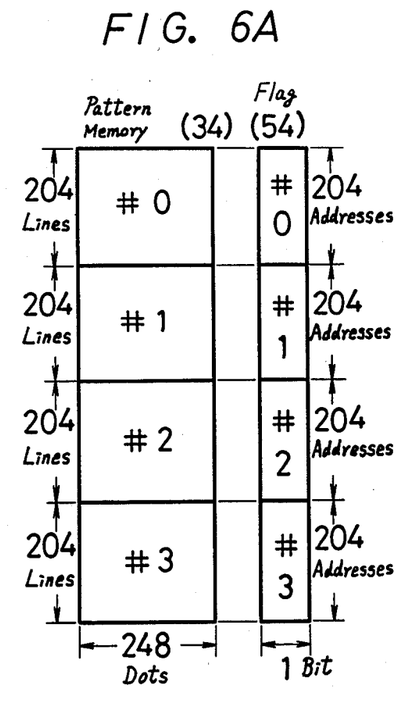
FIG. 6A and 6B are pictorial representations of a pattern memories and flag memories for use in the receiver of FIG. 4 according to an embodiment of the present invention.

According to the present invention, a flag for erasing is set and the display is controlled in accordance with the erasing flag. That is, as shown in FIG. 6A, with respect to the pattern data, one area of the memory 34 is the size of 248 dots×204 line but a separate memory 54 is provided, by way of example, in which flag areas #0 to #3 of 204 addresses are set for one of the areas #0 to #3 and to one line of the areas #0 to #3 in the memory 34 allocated is one address of the memory 54 as a flag PFG. When an erasing code is transmitted for a page of a certain area, the flag PFG in the corresponding area of the memory 54 is set all "0", and next when pattern data are transmitted, the flag PFG corresponding to the line of the pattern data is made "1".

While, upon reading, the flag PFG is checked. When the flag PFG is "0", in place of the pattern data of the corresponding line the erasing data "0" is supplied to the cathode ray tube 16, while when it is "1", the pattern data of the corresponding line is supplied from the memory 34 to the cathode ray tube 16.

Figure 6B:
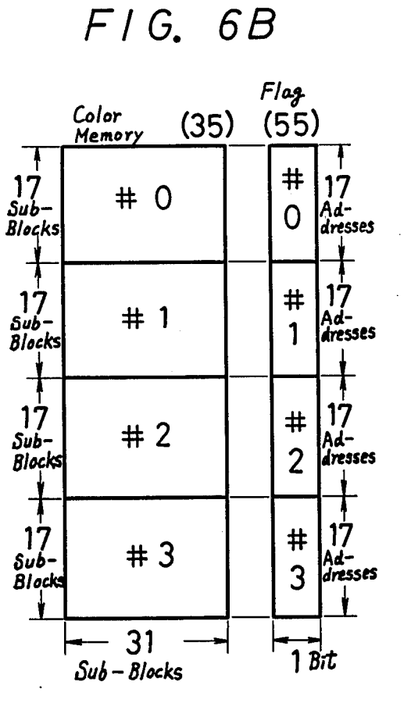

As to the color code, the same operation as above is performed. However, since the color is appointed at the unit of a sub-block and also as shown in FIG. 6B one area if formed of 31×17 sub-blocks, a memory 55 for the flag is 17 addresses per one area and one address is allocated to one line of the sub-block.

Accordingly, even if the area of the memories 34 and 35 is 4 page amounts as set forth above, when the erasing code is transmitted, it is sufficient to set the flags PFG and CFG as "0" for one page amount. In other words, it is unnecessary as in the prior art that the data of one page amount (50592 bits+2108 bits) in the memories 34 and 35 are rewritten but it is enough that one page amount (204 bits+17 bits) of the flags PFG and CFG are rewritten which can be carried out in very short period of time. Therefore, the data memories 34, 35 and flag memories 54, 55 have no need to be high speed ones. Further, the number of areas is not limited by the speed of the memories 34 to 55 so that the number of areas can be increased further.

Also, when the areas are defined in the memories 34 and 35, it is needless to provide the areas separately in chips but it can be set freely so that large capacity memories can be used as the memories 34 and 35 and hence the cost can be reduced or the apparatus becomes small in size and power consumption thereof can be reduced.

BRIEF DESCRIPTION OF DRAWINGS

FIG. 9E is a horizontal sync pulse signal waveform, FIG. 9F is a waveform of a read-out clock pulse signal, FIG. 9G is a read-out row address signal waveform, FIG. 9H is a read-out color row address signal waveform, FIG. 9I is a waveform of a read signal for memories 34 and 35 of FIG. 8.

Figure 8:
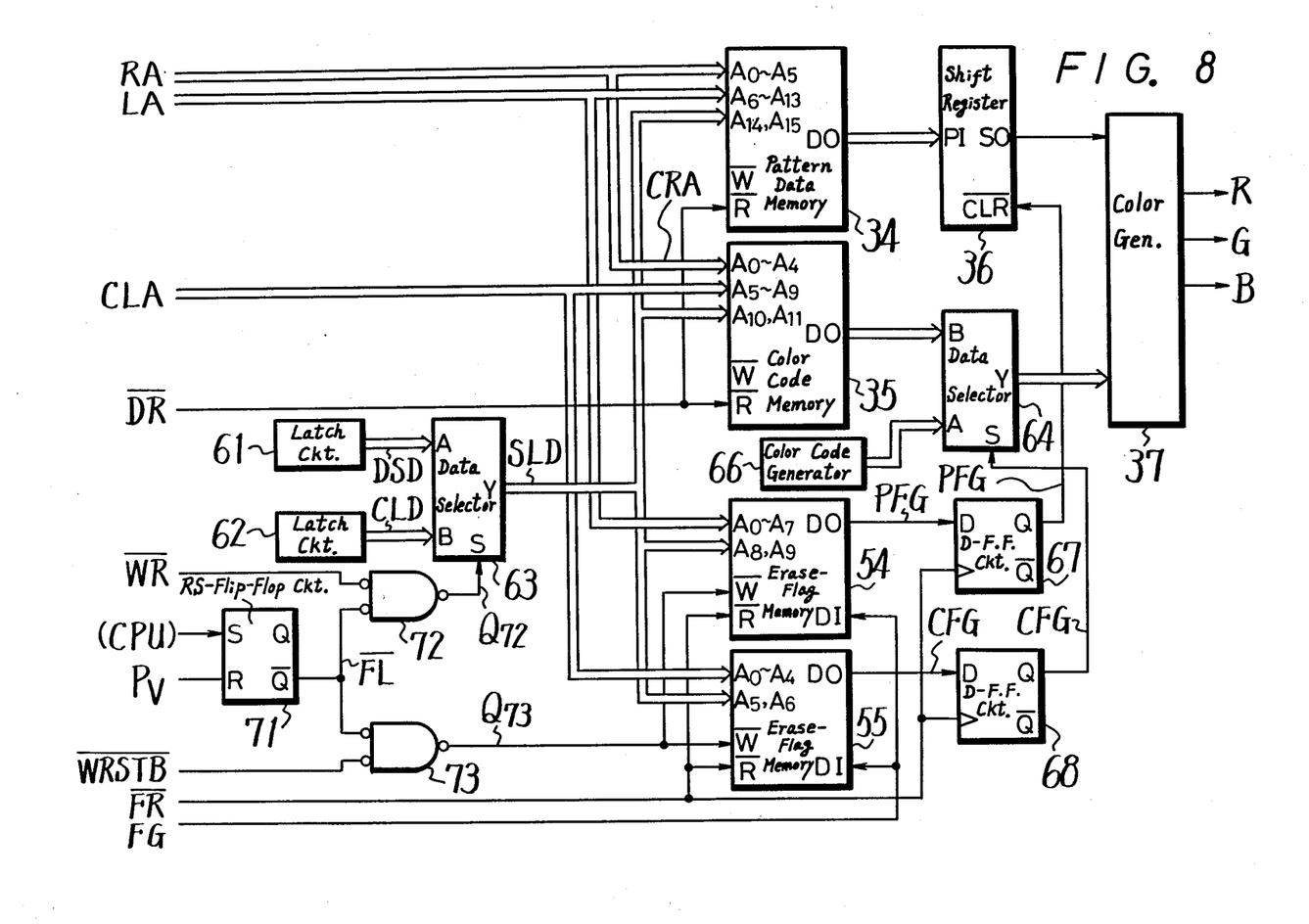
FIG. 8 is a schematic in block diagram form of an image memory system, including a pattern memory, according to an embodiment of the present invention.

FIG. 8 shows an example of the invention. In this example, it be assumed that data are already written in the pattern memory 34 and the color memory 35 and the circuit for the above write-in is omitted (which is same as that of FIG. 4) and also the clock is omitted, too.

Figure 7:
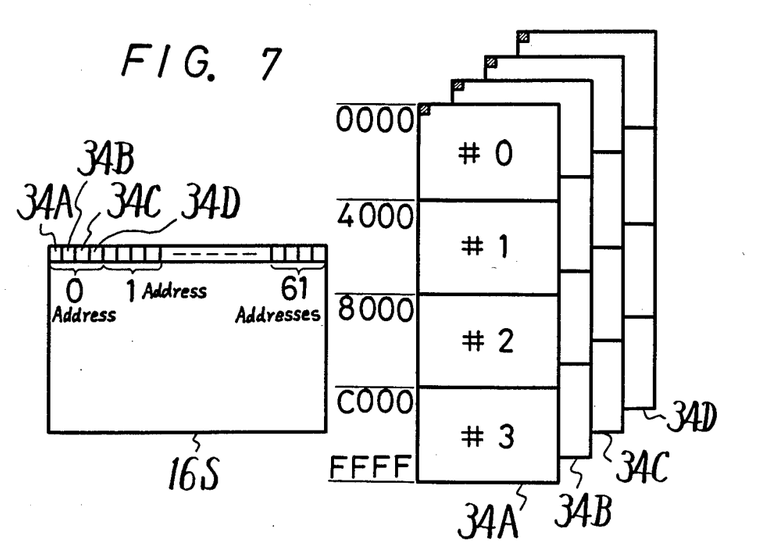
FIG. 7 is a pictorial representation of a picture screen and corresponding memory locations according to an embodiment of the present invention.

The pattern memory 34 is formed of four RAMs 34A to 34D being of 64K×1 bits. For example, for the area #0, as shown in FIG. 7, four dots located on the left-upper portion of a picture screen 16S of the cathode ray tube 16 are respectively read out from 0th addresses of the RAMs 34A to 34D, four next dots from 1st addresses of the RAMs 34A to 34D and so, the addresses of the RAMs 34A to 34D upon reading are made common and one bit (one dot) is read out one address. Accordingly, with respect to the whole of the memory 34, four bits (four dots) are read out at the same time at one address. Also, at this time, as shown in FIG. 7, at every 16K address of the memory 34 the areas #0 to #3 are allocated Further, the color memory 35 is formed of four RAMs of 4K×1 bits and, similar to the pattern memory 34 its addresses upon reading are made common and as the whole, four bits (color data of one sub-block) are read out at one address at the same time and the areas #0 to #3 are allocated thereto at every 4K address. In this case, the pattern data of one page are 50592 bits and the color code is 2108 bits so that there are non-used addresses in the memories 34 and 35.

Also, there are provided memories 54 and 55 for erasing flags. An erasing flag for the pattern data is accessed in the memory 54, while an erasing flag for the color code is accessed in the memory 55. That is, the memory 54 is formed of a RAM of 1K×1 bits in which the areas #0 to #3 are assigned at every 256 addresses and one address (one bit) is assigned to a line on one row of the areas #0 to #3. In this case, since one page consists of 204 lines, there is an unused address in the memory 54, too.

In turn, the memory 55 is formed of a RAM of 128×1 bits in which the areas #0 to #3 are allocated at every 32 addresses and also one address (one bit) is allocated to the sub-block on one line of page of the areas #0 to #3. In the memory 55 there is also an unused address.

There are provided latch circuits 61 and 62 of 2 bits. These latch circuits 61 and 62 are respectively supplied with data from the CPU 21. Thus, in the latch circuit 61 latched is the number of an area displayed at present in the areas #0 to #3 as data DSD of 2 bits, while in the latch circuit 62, latched as data CLD of 2 bits is the number showing the area in the areas #0 to #3 to which a transmitted erasing code belongs.

The data DSD and CLD are selected by a data selector 63. If the selected data is taken as a signal SLD, this signal SLD is fed to upper two bits $A_{14}$ and $A_{15}$ of the addresses of the memory 34. Accordingly, by the signal SLD the address of the memory 34 is appointed at every 16K address i.e. the areas #0 to #3 are appointed. The signal SLD is also fed to upper two bits $A_{10}$ and $A_{11}$ of the addresses of the memory 35 so that the address of the memory 35 is appointed at every 4K address i.e. the areas #0 to #3 are appointed.

The signal SLD is further supplied to the memory 54 at upper two bits $A_8$ and $A_9$ of its addresses so that the areas #0 to #3 of the memory 54 at every 256 address are appointed, and the signal SLD is also fed to the memory 55 at upper two bits $A_5$ and $A_6$ of its addresses so that the areas #0 to #3 of the memory 55 at every 32 address are appointed.

In other words, the areas #0 to #3 of the memories 34, 35, 54 and 55 are simultaneously appointed by the signal SLD.

Also, 64 designates a data selector, 66 a color code generator which produces a color code of "white", 67 a D-type flip-flop circuit which will latch an erasing flag PFG for the pattern data in one horizontal period, 68 a D-type flip-flop circuit which will latch an erasing flag CFG for the color code in one horizontal period, and 71 an RS-type flip-flop circuit which is set by the output from the CPU 21 when an erasing code for a page corresponding to either one of the areas #0 to #3 is transmitted and reset by the next vertical synchronizing pulse Pv.

The shift register 36 is supplied with the flag PFG as a clear signal so that when PFG="1", the pattern data from the pattern memory 34 is converted from the parallel signal to the serial signal and delivered therefrom. While, when PFG="0", the content of the register 36 is cleared up as "0" and then delivered. Accordingly, when PFG="0", the erasing data "0" is derived.

The selector 64 (and 63) delivers the input A thereto as its output Y when the select input S is "0", while delivers the input B thereto as its output Y when "1". Accordingly, when CFG="1" the color code from the color memory 35 is fed through the selector 64 to the color generator 37, while when CFG="0", the color code of "white" from the color code generator 66 is supplied therethrough to the color generator 37. That is, when CFG="0", the erasing data is supplied.

Figure 9A:
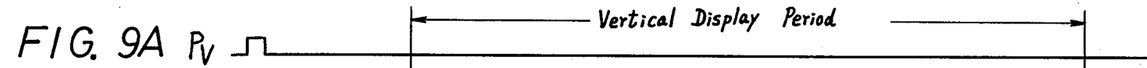
FIG. 9A is a vertical sync pulse signal waveform.
Figure 9B:
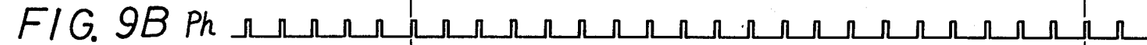
FIG. 9B is a horizontal sync pulse signal waveform.

FIG. 9 shows signal waveforms and so on (in which FIG. 9E and followings are shown with time bases being expanded). In this case, FIG. 9A shows the vertical synchronizing pulse Pv, FIGS. 9B and 9E each the horizontal synchronizing pulse Ph, and FIG. 9F the reading-out clock RCK, respectively. One cycle of the clock RCK corresponds to the display period of one dot. With these signals Pv, Ph and RCK as references, the address signal upon reading-out described later is provided by the generating circuit 42.

That is, FIG. 9G shows a read-out row address signal RA ($RA_0$ to $RA_5$) of 6 bits which is incremented by "1" at every 4 cycles of the clock RCK in the horizontal display period and changed from "0" to "61". Then, this signal RA is supplied to lower six bits $A_0$ to $A_5$ at the address of the memory 34. In this case, since the pattern data of 4 dots (4 bits) per one address are derived from the memory 34, by the fact that the signal RA is changed from "0" to "61", the data of dot on one row of a certain row of a certain area (page) can be obtained sequentially.

Figure 9C:
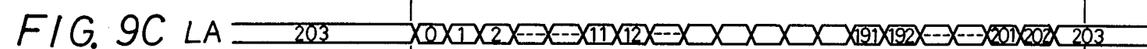
FIG. 9C is a waveform of a read-out line address signal.

FIG. 9C shows a read-out line address signal LA of 8 bits which is incremented by "1" at every horizontal synchronizing pulse Ph in the vertical display period. and changed from "0" to "203". Then, this signal LA is fed to middle 8 bits $A_6$ to $A_{13}$ at the address of the memory 34. Accordingly, a certain row of a certain area (page) is appointed by the signal LA and a row to be appointed is changed next to next at every horizontal scanning.

Accordingly, the area is appointed by the signal SLD and the pattern data of one page amount of the area are allowed by the signals RA and LA to be sequentially read out by 4 bits each in response to the scanning of the cathode ray tube 16.

FIG. 9H shows a read-out color row address signal CRA of 5 bits. This signal CRA are equal to the signal $RA_1$ to $RA_5$ of upper 5 bits in the signal RA ($RA_0$ to $RA_5$) and this signal CRA is supplied to lower 5 bits $A_0$ to $A_4$ at the address of the memory 35. In this case, since the original signal RA increments by "1" at every 4 cycles of the clock RCK as shown in FIG. 9G, the signal CRA with the LSB thereof excluded increments by "1" at every 8 cycles of the clock RCK as shown in FIG. 9H, namely, it increments by "1" at every 8 bits (8 dots) of the pattern data and varys from "0" to "30", so that the address of the memory 35 is appointed by this signal CRA in the horizontal direction at every sub-blocks.

Figure 9D:
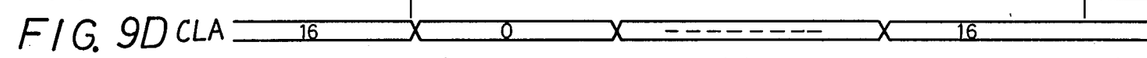
FIG. 9D is a waveform of a read-out color row address signal.

FIG. 9D shows a read-out color row address signal CLA of 5 bits which during the vertical display period increments by "1" at every 12 cycles of the horizontal synchronizing pulse Ph so as to vary from "0" to "16". This signal CLA is supplied to the middle 5 bits $A_5$ to $A_9$ at the address of the memory 35 so that the address of the memory 35 is appointed by the signal CLA at every sub-blocks.

Consequently, the area of the memory 35 is appointed by the signal SLD and the color code of one page amount of the area is sequentially read out by the signals CRA and CLA at sub-block in response to the scanning of the cathode ray tube 16.

Further, the signal LA (FIG. 9C) is supplied to lower 8 bits $A_0$ to $A_7$ of the address of the memory 54. Accordingly, while in the memory 34 the row of the pattern is appointed by the signal LA, in the memory 54 the address is appointed by the signal LA. In other words, through the signal LA, a certain row of the pattern data is associated with a certain address of the memory 54.

Also, the signal CLA (FIG. 9D) is supplied to the lower 5 bits $A_0$ to $A_4$ of the address of the memory 55 so that while in the memory 35 the row of sub-block to read out the color code is appointed by the signal CLA, in the memory 55 the address is appointed by the signal CLA. That is, through the signal CLA a certain row of the sub-block is corresponded with a certain address of the memory 55.

In FIGS. 9 and 8, a signal $\overline{DR}$ (FIG. 9I) and a signal $\overline{FR}$ (FIG. 9L) are read signals for the memories 34, 35 and the memories 54, 55. The signal $\overline{DR}$ equals to "0" during the horizontal display period in the vertical display period in synchronism with the clock RCK at one address of the address signal RA so as to put the memories 34 and 35 into the read mode, while the signal $\overline{FR}$ equals to "0" at every beginning of the horizontal scanning during the vertical display period so as to put the memories 54 and 55 into the read mode.

Figure 9J:
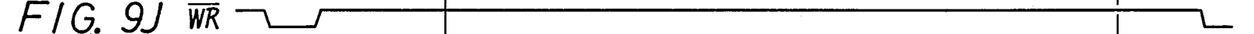
FIG. 9J is a waveform of a write signal for memories 34 and 35 of FIG. 8.
Figure 9K:
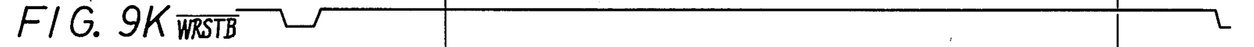
FIG. 9K is a waveform of a write signal for memories 54 and 55 of FIG. 8.

A signal $\overline{WR}$ (FIG. 9J) and a signal $\overline{WRSTB}$ (FIG. 9K) are write signals for the memories 34, 35 and the memories 54, 55, which then become at "0"s at the start of the horizontal display period during the vertical display period and before $\overline{FR}$="0" is satisfied.

Further, in FIG. 8, the signal FG is the signal which becomes the flags PFG and CFG. When receiving the erase code, FG="0" is established, while when receiving the data, FG="1" is established. These signals $\overline{DR}$, $\overline{FR}$, $\overline{WR}$, $\overline{WRSTB}$ and FG are generated from the timing signal generating circuit 42 and the CPU 21.

With this arrangement, if now, no erase code is supplied to the pages stored in the areas #0 to #3, then, in this state, "1" is set in all the flag memories 54 and 55.

The flip-flop circuit 71 is reset by the vertical synchronizing pulse Pv and its output $\overline{FL}$ is "1" so that an output $Q_{72}$ from an AND circuit 72 becomes "0". Accordingly, since in the data selector 63 the input A is selected by the AND output $Q_{72}$, SLD=DSD is presented, which is then fed to the memories 34 and 35 at the upper addresses thereof. Since during the horizontal display period $\overline{DR}$="0" is established, the memories 34 and 35 are addressed by the address signals described in connection with FIGS. 9A to 9H, whereby from the memory 34 is read out in turn the pattern data on the area represented by the data DSD, which is then supplied to the shift register 36, while from the memory 35 is read out in turn the color code on the area represented by the data DSD, which is then supplied to the selector 64.

At this time, since the data DSD is also supplied to the flag memories 54 and 55 at their upper addresses, in the memories 54 and 55 selected are the areas represented by the data DSD. $\overline{FR}$="0" is presented at the beginning of the horizontal scanning so that the memories 54 and 55 are addressed by the address signals described in connection with FIGS. 9A to 9H thus the pattern data flag PFG associated with its horizontal scanning line being read out from the memory 54 at every beginnings of the respective horizontal scannings and the color code flag CFG associated with the sub-block to which its horizontal scanning line belongs being read out from the memory 55 at every beginnings of the respective horizontal scannings as shown in FIG. 9M.

Figures 9L, 9M, 9N:
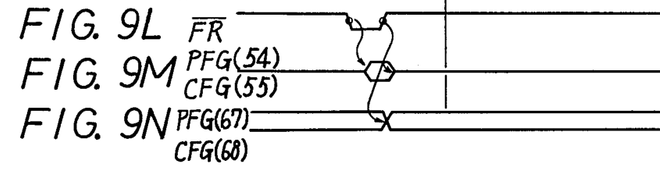
FIG. 9L is a waveform of a read signal for memories 54 and 55 of FIG. 8.
FIG. 9M is a waveform of pattern and error flag signals read out from memories 54 and 55 of FIG. 8.
FIG. 9N is a waveform of pattern and error flag signals read out from flip-flops 67 and 68 of FIG. 8.

The flags PFG and CFG are supplied to the flip-flop circuits 67 and 68 in which they are latched by the signal $\overline{FR}$ and then held till the following horizontal period as shown in FIG. 9N. The flag PFG thus held is supplied to the register 36 as its clear signal, while the flag CFG held is supplied to the selector 64 as its select signal.

In this case, since the erase code is not transmitted, the flags PFG and CFG are at "1" so that the pattern data read out from the memory 34 is not cleared by the register 36 but converted to a serial data and then fed to the color generator 37, while the color code read out from the memory 35 is supplied to the color generator 37 via the selector 64.

Consequently, in this case, of the areas from #0 to #1, is displayed the page written in the area which is appointed by the data from the latch circuit 61.

While, when the display is carried out as described above, let it be assumed that the erase code for the page memorized in a certain area be transmitted where although it does not matter whether such area is utilized for display or not, that area is assumed to be utilized for display in the following description (thus, in the latch circuits 61 and 62 DSD =CLD is established).

That is, if the erase code is transmitted during the packet period (20th or 283rd horizontal period) of a certain field period, the number of the area in which is stored the page of this erase code is latched by the CPU 21 in the latch circuit 62 as the data CLD and the flip-flop circuit 71 is set by the CPU 21 and so there is presented $\overline{FL}$="0".

Subsequently, $\overline{WR}$="0" is presented and at this time, since $\overline{FL}$="0", $Q_{72}$ equals to "1" and thereby the input B is selected in the data selector 63. Consequently, SLD=CLD is established which is then supplied to the memories 54 and 55 at the upper address thereof so that in the memories 54 and 55 appointed are the areas to be erased and indicated by the data CLD.

At this time, since $\overline{WRSTB}=$"0", an output $Q_{73}$ from an AND circuit 73 becomes at "0", the memories 54 and 55 are put into the write mode, and FG="0" is presented.

Accordingly, at this time, since the address signal CLA varies, of the areas #0 to #3 of the memories 54 and 55 in the areas that are appointed by the data CLD is written FG="0", namely, all the flags in the areas appointed by the CLD are set so as to satisfy PFG="0" and CFG="0". In this case, since the areas of the flags PFG and CFG are 204th and 17th addresses which are small in number as shown in FIG. 6, these flags PFG and CFG can be set with enoughly plenty of time during the period from the transmission of the erase code to the beginning of the vertical display period of its field period. After the set of the flags PFG and CFG to the memories 54 and 55 is completed, $\overline{WR}$ equals to "1" and $Q_{72}$ equals to "1", so that SLD=DSD is satisfied in the selector 63, while $\overline{WRSTB}$ equals to "1" and $Q_{73}=$"1" is established so that the memories 54 and 55 are released from the write mode and then put into the high output impedance state.

In the subsequent vertical display period, the pattern data and the color code are read out from the memories 34 and 35 as described above and then supplied to the register 36 and the selector 64, while the flags PFG and CFG are read out from the memories 54 and 55, latched by the flip-flop circuits 67 and 68 and then fed to the register 36 and the selector 64. In this case, since PFG="0", the pattern data in the register 36 is cleared, while since CFG="0", the input B is selected in the selector 64 and thereby the color code of "white" from the color code generator 66 is selected.

Consequently, from the register 36 successively derived as the pattern data is "0" which is then fed to the color generator 37 and the color code of "white" from the color code generator 66 is supplied to the color generator 37 so that nothing is displayed during this vertical display period.

In other words, the picture screen of the cathode ray tube 16 is erased by the transmission of the erase code, which means that the erasure of the screen is carried out immediately during the same field period when the erase code is transmitted. At this time, the access of the data for the memories 34 and 35 by the erase code is not achieved.

During the next field period, the flip-flop circuit 71 is reset by the vertical synchronizing pulse Pv thereof to present $\overline{FL}=$"1".

Further, during this field period, although the color code is transmitted during the packet period, after its receiving process is finished, the flip-flop circuit 71 is set by the CPU 21 and thus $\overline{FL}=$"0" and $\overline{WR}=$"0" are established so that $Q_{72}=$"1" is satisfied. Therefore, SLD=CLD is established, and so in the memories 34 and 35 appointed are the areas of the pages to which the erase code is supplied. The memory 35 is appointed by the CPU 21 for its address corresponding to the subblock of the first line in the area indicated by the data CLD and in the appointed address is written the color code which was previously received and processed.

At this time, the memories 54 and 55 are appointed by the data CLD at their areas of the page to which the erase code is transmitted and $\overline{WRSTB}=$"0" is established so that $Q_{73}=$"0" is satisfied and thereby the memories 54 and 55 are put into the write mode. Then, the memory 55 is addressed by the CPU 21 and FG="1" is established, so that in the address of the memory 55 corresponding to the subblock of the first line of the area designated by the data CLD, written is FL="1", namely, the flag CFG corresponding to the sub-block of the first line is set to "1".

After these processings are finished, $\overline{WR}=$"1" and $\overline{WRSTB}=$"1" are established so that the memories 34 to 55 are appointed by the data DSD for their areas and then released from their write mode.

During the next vertical display period, as shown in FIGS. 9I to 9N, the pattern data and the color code are read out from the memories 34 and 35 and the flags PFG and CFG are read out from the memories 54 and 55. In this case, since the flags PFG of the pattern data are all at "0", the pattern data is cleared in the register 36 and hence no pattern is displayed. However, since the flag CFG of the sub-block of the first line is at "1", the color code from the memory 35, namely, the color code received before the beginning of the vertical display period is supplied to the color generator 37 via the data selector 64.

During the following field period, the flip-flop circuit 71 is set by the vertical synchronizing pulse Pv and thereby $\overline{FL}=$"0" is established. While, during the packet period, although the pattern data of the first line is transmitted, similarly as in the case of color code, this pattern data is written in the address of the first line in the area of the memory 34 which is appointed by the data CLD and in the memory 54, the flag PFG of the address corresponding to the first line in the area appointed by the data CLD is set to "1".

Therefore, during the subsequent vertical display period, although the pattern data are read out from the memory 34, the pattern data of the first line was updated by the pattern data of the immediately preceding packet period. At this time, since the corresponding flag PFG is at "1", that pattern data is not cleared in the register 36 but supplied to the color generator 37. Moreover, as regards the sub-block of the first line, the flag CFG is set to "1" during the field period before one field.

Thus, the first line is displayed in color on the picture screen of the cathode ray tube 16.

Like operation is continued till the pattern data and the color code of the final line of the page to which its erase code is supplied whereby the character broadcast picture is displayed on the screen of the cathode ray tube 16 from the top to the bottom in a wipe-manner. After the data of that page were all transmitted, at the same time when the writing of the pattern data and the color code of this page is completed, the setting of the flags PFG and CFG is also completed.

Since at the end of this operation, the flags PFG and CFG of the area are all at "1", thereafter the pages stored in this area will normally be displayed as described above.

As described above, according to this invention, there are provided the flags PFG and CFG in correspondence with the line or sub-block to which the data is belonging, in which when the erase code is transmitted, the flags PFG and CFG are all set to "0" and when the data is transmitted subsequently, the data is written in the corresponding addresses of the memories 34 and 35 and the corresponding flag PFG or CFG is set to "1", while when reading out the data, the display is controlled by the flag PFG or CFG corresponding to the data. Accordingly, even if the areas of the memories 34 and 35 are of, for example, 4 page amounts as described above, when the erase code is transmitted, it is sufficient to set the flags PFG and CFG to "0" by one page amount. In other words, unlike the prior art, it is not necessary to rewrite the data of one page amount (50592 bits+2108 bits) of the memories 34 and 35, but it is sufficient to rewrite one page amount (204 bits+17 bits) of the flags PFG and CFG, merely, which can be carried out in quite a short time period, and so no high-speed memories are required for the data memories 34 and 35 and the flag memories 54 and 55. Moreover, since the number of areas is not restricted by the speed of the memories 34 to 55, the number of the areas can be increased more.

When the areas are set in the memories 34 and 35, the area does not have to be set separately for each chip, but can freely be set, with a result that the memories 34 and 35 of a large capacity can be utilized and the low cost, compactness, and reduction of power consumption are made possible.

While in the above the memories 34 and 35 are formed individually, the memory 35 can be replaced by the vacant or unused addresses of the memory 34, which are same for the memories 54 and 55.

While in the above embodiment when the erase code is transmitted, the corresponding flags PFG and CFG are all set to "0" until the vertical display period starts, a pair of flags PFG and CFG may be set to "0" at every horizontal scannings before the beginning of the horizontal display period. Furthermore, the setting of flags PFG and CFG to "0" or "1" can be carried out by hardware processing. At any rate, since the bit number to be set is few, the set can be carried out in quite a short time period.

INDUSTRIAL APPLICABILITY

This invention can also be applied to the CAPTAIN system.

I claim:

1. An image display apparatus comprising image memory means having plural display areas corresponding to areas of a visual display and for storing image signals of plural pages, each page being formed of a plurality of packets of data, and read out means for reading out said image signal in said image memory means and supplying it to an image display means for visual display, in which said image memory means includes a pattern memory for storing plural line data of the image to be displayed, and said image display apparatus further comprises flag memory means having plural flag areas corresponding to respective ones of said plural display areas of said image memory means and in which said plural flag areas include plural line flag areas corresponding to each line of said image to be displayed, flag control means for setting a flag of a corresponding display area to a first value when an erase code contained in one of said plurality of packets is received and setting said flag to a second value when an image signal contained in said plurality of packets is received, and read out control means for controlling said read out means so as to supply a blank signal instead of the image signal of said corresponding display area to said image display means when said corresponding flag is set to said first value, and to supply the image signal in said corresponding display area to said image display means when said corresponding flag is set to said second value.

2. An image display apparatus according to claim 1, further comprising plural color memories and plural color flag memories each corresponding to each of said color memories.

3. An image display apparatus according to claim 2, wherein said flag control means sets said color flag of corresponding color memory to a first value when said erase code is received and sets said color flag to a second value when image signals are received, and said read out control means supplies a non-color signal instead of the color signal in said corresponding color memory to said image display means when said corresponding color flag is set to said first value, and supplies the color signal in said corresponding color memory to said image display means when said corresponding color flag is set to said second value.

* * * * *